United States Patent
Muroi et al.

(10) Patent No.: US 6,283,341 B1
(45) Date of Patent: Sep. 4, 2001

(54) CONTINUOUS CASTING NOZZLE FOR MOLTEN STEEL

(75) Inventors: Toshiyuki Muroi; Kazumi Oguri, both of Gifu (JP)

(73) Assignee: Akechi Ceramics Kabushiki Kaisha (JP)

(*) Notice: Subject to any disclaimer, the term of this patent is extended or adjusted under 35 U.S.C. 154(b) by 0 days.

(21) Appl. No.: 09/349,342

(22) Filed: Jul. 8, 1999

(30) Foreign Application Priority Data

Jul. 9, 1998 (JP) .................................................. 10-208524

(51) Int. Cl.[7] .................................................... B22D 35/00

(52) U.S. Cl. ............................................ 222/606; 501/101

(58) Field of Search .................................. 222/606, 607; 501/84, 101, 99; 266/280, 286

(56) References Cited

U.S. PATENT DOCUMENTS 5,840,433 * 11/1998 Juma ...................................... 428/689
5,911,900 * 6/1999 Muroi et al. .......................... 222/606

FOREIGN PATENT DOCUMENTS

0846514A1 * 10/1998 (EP) .
402172859A * 7/1990 (JP) .

* cited by examiner

Primary Examiner—Scott Kastler
(74) Attorney, Agent, or Firm—Cantor Colburn LLP

(57) ABSTRACT

A continuous casting nozzle for casting molten steel, wherein at least a surface layer of an inner bore of the continuous casting nozzle contacting with a molten steel is formed of a refractory comprising: an aggregate consisting essentially of zirconia ($ZrO_2$), or comprising zirconia ($ZrO_2$) as its main component and melting point thereof being at least 1750° C.: from 15 to 60 wt. %; and roseki as a balance. The refractory is added to a thermosetting resin as a binder, kneaded, formed, and sintered in an anti-oxidizing atmosphere.

5 Claims, 1 Drawing Sheet

CONTINUOUS CASTING NOZZLE FOR MOLTEN STEEL

FIELD OF THE INVENTION

The present invention relates to a continuous casting nozzle, in particular, a continuous casting nozzle which permits effective prevention of narrowing and clogging of the inner bore thereof through which molten steel passes in performing continuous casting of the molten steel containing aluminum such as aluminum-killed steel, which nozzle is provided for supplying the molten steel from a tundish to a mold.

THE RELATED ART

A continuous casting nozzle for casting molten steel is used for the following purposes.

A continuous casting nozzle has a function of pouring molten steel from a tundish to a mold. In continuously casting molten steel, a continuous casting nozzle is used for such purpose of preventing the molten steel from being oxidized by contacting with the open air and from splashing when the molten steel is poured from a tundish to a mold, and rectifying the flow of the poured molten steel for preventing non-metallic inclusion and slag present near or on the mold surface from being entrapped in the cast steel strand.

A refractory of a conventional continuous casting nozzle of molten steel comprises graphite (about 30 wt. %), alumina (about 60 to 70 wt. %), silica, silicon carbide and the like. However, there are following problems when aluminum-killed steel or the like is cast.

In casting the aluminum-killed steel or the like, aluminum which is added as a de-oxidizer, reacts with oxygen existing in the molten steel to produce non-metallic inclusion such as alpha ($\alpha$)-alumina. Furthermore, when the molten steel flows through the nozzle, the aluminum in the molten steel reacts with oxygen in the open air, to further produce alumina.

Therefore, in casting the aluminum-killed steel or the like, the non-metallic inclusion such as $\alpha$-alumina adheres and accumulates onto the surface of the inner bore of the continuous casting nozzle, so that the inner bore is narrowed or clogged up in the worst case so as to make the stable casting thereof difficult. Furthermore, the non-metallic inclusion such as $\alpha$-alumina adhered or accumulated onto the surface of the inner bore peels off or falls down, and is entrapped in the cast steel strand, thus degrading the quality of the cast steel strand.

In order to prevent the above-mentioned reduction or clogging of the inner bore of the nozzle caused by the non-metallic inclusion such as $\alpha$-alumina, there has widely been used the method for preventing the non-metallic inclusion such as $\alpha$-alumina existing in the molten steel from adhering or accumulating on the surface of the inner bore of the nozzle by means of ejecting inert gas from the inner surface of the nozzle bore toward the molten steel flowing through the inner bore (for example, the method disclosed in Japanese Patent Publication No. Hei 6-59533/1994).

However, there are problems in the above-mentioned method wherein the inert gas is ejected from the inner surface of the inner bore of the nozzle, as follows:

A large amount of the ejected inert gas causes entrapment into the cast steel strand of bubbles produced by the inert gas, to cause pinholes in the cast steel strand, thus deteriorating the quality of the cast steel. On the other hand, a small amount of the ejected inert gas causes adhesion and accumulation of the non-metallic inclusion such as the $\alpha$-alumina onto the surface of the inner bore of the nozzle, thus causing narrowing or clogging, in the worst case, of the inner bore.

In addition, it is substantially difficult to manufacture the nozzle which enable to uniformly eject the inert gas from the inner surface of the nozzle bore toward the molten steel flowing through the inner bore. Furthermore, when the casting is performed for a long period of time, it becomes gradually difficult to stably control the amount of ejected inert gas, since the refractory material of the continuous casting nozzle degrades. As a result, the non-metallic inclusion such as $\alpha$-alumina adheres and accumulates onto the surface of the inner bore of the nozzle in such manner that the inner bore is narrowed or eventually clogged up. The clogging of the nozzle by the non-metallic inclusion, particularly alumina ($Al_2O_3$) inclusion is deemed to be caused as follows:

(1) Aluminum in the molten steel is oxidized by the entrapped air in a joint portion of the nozzle refractory and the tundish refractory, and the air which passes through the refractory structure per se.

(2) Alumina inclusion is produced by the oxygen supplied from SiO which is produced through reduction of silica in a carbon-containing refractory.

(3) Alumina inclusion is produced by diffusion and cohesion of the alumina produced in the above process.

(4) Graphite and carbon on the surface of the nozzle bore are taken away and the feature of the surface of the inner bore becomes rough, and thus the alumina inclusion is apt to accumulate on the rough surface of the bore.

There is proposed a nozzle as a remedy to solve the above problem, in which a non-oxide raw material (SiC, $Si_3N_4$, BN, $ZrB_2$, Sialon, etc.) that has a low reactivity with aluminum oxide is added to alumina-graphite refractory, or a nozzle consisting of the above non-oxide material itself (for example, refer to Japanese Patent Publication No. Sho 61-38152/1986).

However, it is not practical to add the above non-oxide material to the widely used alumina-graphite refractory, because the effect of preventing adhesion is not recognized unless a large amount of the non-oxide material is added, and furthermore, the corrosion resistance thereof is deteriorated when a large amount of the non-oxide material is added thereto.

Also, the nozzle consisting essentially of the non-oxide material is not suitable for practical use, since the material cost and manufacturing cost are expensive, although the substantial effect of preventing adhesion may be expected.

There is further proposed a nozzle, the refractory thereof comprising graphite-oxide raw material containing CaO, in which an oxide raw material containing CaO ($CaO \cdot ZrO_2$, $CaO \cdot SiO_2$, $2CaO \cdot SiO_2$, and the like) produces a low-melting-point material by a reaction of CaO in the oxide raw material with $Al_2O_3$, and thus produce low-melting-point material exists in the steel (for example, refer to Japanese Patent Publication No. Sho 62-56101/1987).

However, since the reactivity of CaO with $Al_2O_3$ is apt to be influenced by a temperature condition of the molten steel in casting, it is difficult to effectively produce the low-melting-point material. In addition, a large amount of CaO is required to supply when a large amount of $Al_2O_3$ inclusion is contained in the steel. However, it is difficult to contain sufficient amount of CaO in the refractory of the nozzle, since spalling resistance and corrosion resistance thereof is deteriorated.

SUMMARY OF THE INVENTION

The object of the present invention is to provide a continuous casting nozzle which may prevents alumina inclusion from adhering and accumulating on the inner surface of the nozzle, and prevents the inner bore of the nozzle from being narrowed and clogged so as to enable a stable casting, by means of forming a glass layer on the surface of the inner bore of the nozzle when the nozzle is used, thereby preventing air from being entrapped through refractory structure thus not to produce alumina, and in addition, smoothing the surface of the inner bore of the nozzle.

There is proposed as the first embodiment of the present invention, a continuous casting nozzle for casting molten steel wherein at least a surface layer of an inner bore of said continuous casting nozzle contacting with a molten steel is formed of a refractory comprising an aggregate consisting essentially of zirconia ($ZrO_2$), or an aggregate comprising zirconia ($ZrO_2$) as its main ingredient and melting point thereof being at least 1750 degree centigrade: from 15 to 60 wt. %; and roseki as a balance (i.e., the remaining portion of the refractory).

When the nozzle formed of a refractory having the above composition is used, zirconia ($ZrO_2$) functions to maintains the strength of the refractory, and roseki forms glass layer, when the roseki contacts the molten steel, to prevent air from infiltrating into the refractory of the nozzle, as a result, the molten steel is not oxidized, alumina is not produced and the clogging of the nozzle can be effectively prevented from occurring.

There is proposed as the second embodiment of the present invention, a continuous casting nozzle for casting molten steel, wherein at least a surface layer of an inner bore of said continuous casting nozzle contacting with a molten steel is formed of a refractory comprising an aggregate consisting essentially of zirconia ($ZrO_2$), or an aggregate comprising zirconia ($ZrO_2$) as its main component and melting point thereof being at least 1750° C.: from 15 to 60 wt. %; and roseki as a balance (i.e., the remaining portion of the refractory); said refractory being added thermosetting resin as binder, kneaded, formed, and sintered in an anti-oxidizing atmosphere.

When the thermosetting resin is added to the refractory material comprising the above components, and thus formed body of the nozzle is sintered in the anti-oxidizing atmosphere, the carbon content in the resin is not oxidized, as a result, the formed body may be sufficiently sintered.

There is proposed as the third embodiment of the present invention, wherein said roseki comprises pyrophyllite ($Al_2O_3.4SiO_2.H_2O$) as its main component.

In the roseki comprising pyrophyllite ($Al_2O_3.4SiO_2.H_2O$) as its main component, $SiO_2$ contained in roseki is stable not to be decomposed, thus, the molten steel is not oxidized, as a result, alumina which causes the clogging of the nozzle bore may be effectively prevented from being produced.

There is proposed as the fourth embodiment of the present invention, wherein said roseki is calcinated at a temperature of at least 800° C. so as to remove a crystal water thereof.

The Roseki which is calcinated at a temperature of at least 800° C. so as to remove a crystal water does not produce water in the sintering process of the nozzle, thus the expansion of the formed body of the nozzle is effectively prevented to manufacture the nozzle without cracks.

PREFERRED EMBODIMENTS OF THE INVENTION

Figure 1:
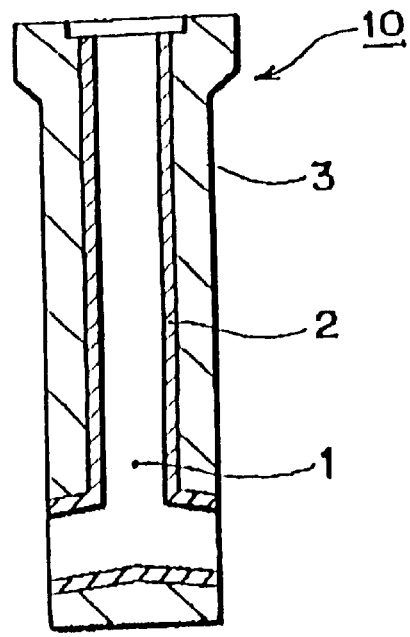
FIG. 1 schematically shows a longitudinal cross section of a nozzle according to the present invention in which the refractory of the invention is formed at the surface layer of the inner bore of the nozzle contacting with molten steel.

A major characteristic of a continuous casting nozzle of the present invention is that the refractory of the surface layer of the bore of the nozzle comprises roseki and an aggregate consisting essentially of zirconia ($ZrO_2$), or roseki and an aggregate comprising zirconia ($ZrO_2$) as its main ingredient and melting point thereof being at least 1750 degree centigrade. More specifically, graphite is not contained in the surface layer of the inner bore of the nozzle of the invention.

The aggregate consisting essentially of zirconia ($ZrO_2$), or the aggregate comprising zirconia ($ZrO_2$) as its main ingredient and melting point thereof being at least 1750 degree centigrade, for example, zircon ($ZrO_2.SiO_2$), has a thermal conductivity of up to 0.0051 (cal/sec/cm/° C.) which is smaller than that of alumina ($Al_2O_3$) or magnesium (MgO), and has a property of excellent wetting resistance to molten steel. In addition, since graphite is not contained in the surface layer of the inner bore of the nozzle of the invention, the nozzle has an excellent heat resistance, and effectively prevent metal or non metallic inclusion such as alumina ($Al_2O_3$) from adhering thereon.

A mixing weight ratio in the surface layer of the inner bore of the aggregate consisting essentially of zirconia ($ZrO_2$), or the aggregate comprising zirconia ($ZrO_2$) as its main ingredient and melting point thereof being at least 1750 degree centigrade, for example, zircon ($ZrO_2.SiO_2$), is within a range of from 15 to 60 wt. %.

With a mixing weight ratio of the aggregate below 15 wt. %, the strength of the surface layer of the inner bore of the nozzle is not sufficient. With a mixing weight ratio of the aggregate over 60 wt. %, sufficient amount of roseki is not contained in the surface layer of the inner bore of the nozzle. The above aggregate has a function to provide the surface layer of the inner bore of the nozzle with strength and corrosion resistance.

Graphite contained in the conventional nozzle reacts with silica contained in the nozzle, when the nozzle is used, as follows:

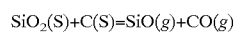

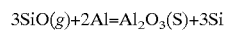

According to the above reactions, the silica in the nozzle is decomposed to produce SiO(g) and CO(g), which become an origin to supply oxygen, and thus supplied oxygen reacts with aluminum in the steel to form $Al_2O_3$.

However, the particles of zircon and roseki do not decompose even if oxygen coexists in the molten steel. In particular, the $SiO_2$ contained in pyrophyllite ($Al_2O_3.4SiO_2.H_2O$) which is the main mineral of the roseki is stable. The above-mentioned fact is acknowledged in the following manner: a briquette comprising the zircon or the roseki, resin powders and carbon powders was formed and buried in a breeze, and heat-treated at a temperature of 1500° C. for 24 hours, and the thus treated briquett was investigated with a microscope to find that the particles did not decay and bubbles were not produced.

The conventional refractory material with graphite of 10 wt. % added has a thermal conductivity of 9.8 (kcal/m/hr/° C.), whereas the refractory material of the invention without grahite has such a low thermal conductivity as 0.7 (kcal/m/hr/° C.), and excellent heat resistance, which shows effective prevention of metal or non-metallic inclusion such as α-alumina from adhering or precipitating.

In addition, in the conventional nozzle containing graphite, when the graphite is oxidized, the smoothness of the surface of the inner bore is lowered. Furthermore, the molten steel flowing through the inner bore of the nozzle produces turbulence so as to cause the non-metallic inclusion such as α-alumina to accumulate on the inner surface of the nozzle. However, since the surface layer of the inner bore of the nozzle of the invention does not contain graphite, the smoothness of the surface of the inner bore is not lowered, namely, concave and convex portions are not formed on the inner surface of the nozzle, thus the non-metallic inclusion such as α-alumina is not accumulated on the inner surface of the nozzle.

The half-melting temperature of the roseki is about 1550° C., so that it melts at the bore surface contacting with the molten steel to form a glass coat in such manner that the structure of the surface of the inner bore is smooth and air is prevented from being entrapped through a refractory structure.

The above-mentioned fact was acknowledged in the following manner: the refractory comprising alumina-roseki with graphite added is heat-treated at a temperature of 1500° C. for 1 hour in the oxidizing atmosphere, and the permeability thereof was investigated to find out to be about $6.5 \times 10^{-2}$ darcy, whereas the refractory comprising alumina-roseki without graphite was heat-treated at a temperature of 1500° C. for 1 hour in the oxidizing atmosphere, and the permeability thereof was investigated to find out to be about $1.0 \times 10^{-4}$ darcy, thus the permeability is lowered.

The roseki is contained in the refractory of the surface layer of the inner bore of the nozzle as a balance, i.e., the remaining portion. To actively form the glass coat on the surface of the inner bore when used as a continuous casting nozzle, a mixing weight ratio of the roseki in the surface layer of the inner bore of the nozzle is preferably at least 40 wt %. Also, it is preferably that the mixing weight ratio of the roseki in the surface layer is up to 85 wt %, because with the mixing weight ratio of the roseki over 85 wt %, degree of softening deformation is large.

Three kinds of roseki may be used as the above-mentioned roseki, that is pyrophyllite roseki, kaolin roseki, and sericite roseki. The pyrophyllite roseki with refractoriness from SK29 to SK32 (SK is a Japanese Standard for refractoriness) is the most suitable, because the roseki is half-molten when the surface layer of the inner bore contacts with the molten to form a glass layer and the erosion resistance thereof against the molten steel is excellent. On the other hand, the kaolin roseki has a greater refractoriness from SK33 to SK36, and the sericite roseki has a smaller refractoriness from SK26 to SK29, both of which are not preferable.

It is preferable to use the roseki calcinated at a temperature at least 800° C. to vanish (remove) crystal water. The reason for using the above roseki is that when the formed body of the nozzle containing not calcinated roseki is formed and sintered, the crystal water is released from the roseki at a temperature within a range of from 500 to 800° C. in sintering thereof, and then, the formed body may cracks by virtue of an unusually large thermal expansion coefficient.

It is preferable that a mixing weight ratio of roseki having average grain diameter of up to 250 μm should be up to 60 wt. % relative to the total content of the roseki, because when a mixing weight ratio of roseki having average grain diameter of up to 250 μm is over 60 wt. %, structural defects such as lamination are apt to be produced in molding and softening deformation of roseki particles is apt to happen when used as a continuous casting nozzle.

Roseki comprising pyrophyllite ($Al_2O_3.4SiO_2.H_2O$) as its main component may be preferably contained in the refractory within a range from 65 to 85 wt. %. In the refractory comprising an aggregate consisting essentially of zirconia ($ZrO_2$), or an aggregate comprising zirconia ($ZrO_2$) as its main ingredient for example zircon within a range of from 15 to 60 wt. %, and roseki as the balance, roseki particles are not discomposed, so that oxygen is not supplied into the molten steel, contrary to $SiO_2$.

The half-melting temperature of the roseki is about 1550° C. which is almost the same temperature as the casting temperature of molten steel. Accordingly, the roseki melts at the surface of the inner bore of the nozzle contacting with the molten steel to form a glass coat in such manner that the structure of the surface of the bore is smoothed and air is prevented from being entrapped through a refractory structure, thus preventing alumina ($Al_2O_3$) and metal from adhering.

As an aggregate, zirconia ($ZrO_2$), or zirconia ($ZrO_2$) as its main ingredient and melting point thereof being at least 1750 degree centigrade, for example, zircon ($ZrO_2.SiO_2$) may be used in the invention. The aggregate comprising the above-mentioned composition has high corrosive resistance against molten steel. In addition, the roseki is melt near the surface of the refractory contacting molten steel (i.e., working surface of the refractory) to form glass layer, and the aggregate reacts with the glass layer, so that a low-melting-point material is hardly produced, thus effectively prevent erosion of the refractory. In addition, the aggregate has a low thermal conductivity and is excellent in heat resistance so as to function to prevent metal from adhering.

Thermosetting resin, for example, phenol resin, furan resin or the like is added as a binder within a range of from 5 to 15 wt. % to the above-mentioned material comprising the roseki and the aggregate, and a formed body of a nozzle is prepared and sintered. It is preferable that the above-mentioned formed body is prepared by the CIP (Cold Isostatic Pressing) process, considering that the formed body is uniformly compressed through the CIP process. The sintering temperature is preferably within a range of from 1000 to 1300° C. Reduction atmosphere, namely the anti-oxidizing atmosphere is preferable than the oxidizing atmosphere as the sintering atmosphere because the added thermosetting resin is not oxidized in the reduction atmosphere.

The continuous casting nozzle for molten steel according to the present invention is described in detail with reference to the drawings.

FIG. 1 schematically shows a vertical sectional view of the immersion nozzle for continuous casting according to the present invention. The continuous casting nozzle 10 is placed between a tundish and a mold, and used as an immersion nozzle for pouring the molten steel from the tundish to the mold.

As shown in FIG. 1, a surface layer 2 of the inner bore 1, through which the molten steel flows, of the immersion nozzle 10 is formed by a refractory having the chemical composition as described above. The remaining part of the nozzle 3 is formed by a conventional alumina-gaphite refractory comprising alumina (about 65 wt. %) and graphite (about 35 wt. %).

The dimensions of the nozzle are about 1 m in total length, about 60 mm in diameter of the inner bore, 160 mm in outer diameter of the nozzle, and about 50 mm in thickness. The thickness of the surface layer of the inner bore made of the refractory in connection with the present invention is from about 2 to about 15 mm. The above-mentioned dimensions are shown as the example, and the nozzle of the present invention is not limited to the above dimensions. More specifically, the dimensions vary in accordance with the composition of the molten steel to be cast, and the size of the cast strand.

Figure 2:
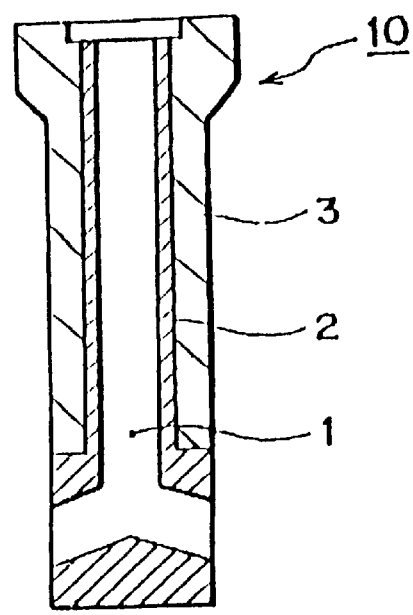
FIG. 2 schematically shows a longitudinal cross section of a nozzle according to the present invention in which the refractory of the invention is formed both at the surface layer of the bore of the nozzle and the lower part (a part immersed in the molten steel) of the nozzle.

FIG. 2 schematically shows a longitudinal cross section of a nozzle in which the surface layer of the bore of the nozzle and the lower part (a part immersed in the molten steel) of the nozzle is made of the refractory according to the present invention. In either case, alumina which clogs the inner bore of the nozzle is collected at the lower part of the inner bore of the nozzle. According to the immersion nozzle of the present invention, the non-metallic inclusion such as alumina is prevented from adhering and accumulating on the surface layer portion 2 of the inner bore 1. The present invention is described by the examples.

EXAMPLES

Phenol resin in the state of powder and liquid was added in an amount within a range of from 5 to 10 wt. % to each of nine pieces of mixed materials having a different chemical composition, and kneaded. From the thus kneaded materials, the following formed bodies were prepared, namely, A first formed body (hereinafter referred to as the "formed body 1") with dimensions of 30 mm×30 mm×230 mm for investigating an amount of adhesion of non-metallic inclusion such as alumina and corrosion resistance against the molten steel;

a second formed body (hereinafter referred to as the "formed body 2") with dimensions of 50 mmØ×20 mm for investigating permeability; and a third formed body (hereinafter referred to as the "formed body 3") with dimensions of 100 mm in outer diameter, 60 mm in inner diameter and 250 mm in length for investigating spalling resistance, were respectively prepared, and then the respective bodies was sintered in reducing atmosphere at a temperature within a range from 1000 to 1200° C. to prepare samples No. 1 to 9.

The samples No. 1 to 5 (hereinafter referred to as the "sample of the present invention") have the chemical compositions within the scope of the present invention, and the samples No. 6 to 9 (hereinafter referred to as "sample for comparison") have the chemical compositions out of the scope of the present invention.

Physical properties (porosity and bulk density) for each of the above-mentioned samples of the present invention Nos. 1 to 5 and the samples for comparison Nos. 6 to 9 are shown in Table 1. The spalling resistance of the samples of the present invention Nos. 1 to 5 and the samples for comparison Nos. 6 to 9 prepared by the formed body 3 were investigated after heating at a temperature of 1500° C. for 30 minutes in an electric furnace and then rapidly cooling by water. The results thereof are shown in Table 1.

An erosion ratio (%) and an amount of adhesion of non-metallic inclusion such as alumina of the samples of the present invention Nos. 1 to 5 and the samples for comparison Nos. 6 to 9 prepared by the formed body 1 were investigated after immersing in molten steel having a temperature of 1520° C. for 180 minutes, which contains aluminum within a range from 0.02 to 0.05 wt %. The results thereof are also shown in Table 1.

The permeability of the samples of the present invention Nos. 1 to 5 and the samples for comparison Nos. 6 to 9 prepared by the formed body 2 were investigated after heating at a temperature of 1500° C. for 60 minutes in an electric furnace and then cooling. The results thereof are also shown in Table 1.

As is clear from Table 1, all of the samples of the present invention show excellent spalling resistance, and the non-metallic inclusion such as alumina are not adhered in spite of the low erosion rate, thereby effectively preventing narrowing or clogging of the continuous casting nozzle for molten steel.

Also, it is possible for the samples of the present invention to prevent air from being entrapped through the refractory in practical use because of small permeability.

On the other hand, it is obvious that the sample for comparison No. 6 is remarkably inferior in the corrosion resistance against the molten steel, although a small amount of alumina adheres due to a large amount of roseki content.

As for the sample for comparison No. 7, the amount of adhesion of alumina is remarkably large, because it contains $ZrO_2$ and $SiO_2$, in which $SiO_2$ decomposes to supply oxygen in the steel, and furthermore, the sample for comparison No. 7 is inferior in corrosion resistance against the molten steel. The sample for comparison No. 8 is remarkably inferior in spalling resistance, has a high permeability and shows adhesion of large amount of non-metallic inclusion such as alumina, due to the small amount of roseki content and the large amount of $ZrO_2$, inspite of the mineral supplying oxygen into the molten steel is removed.

As for the sample for comparison No. 9 which comprises graphite, roseki and $ZrO_2$, and has a high thermal conductivity, the amount of alumina adhesion is slightly large and the amount of metal adhesion is large when the temperature of the molten steel is as low as 1520±10° C. due to the containing of graphite.

Therefore, with the use of the continuous casting nozzle according to the present invention, it is possible to perform stable casting without deterioration of the refractory structure, while preventing narrowing or clogging of the bore caused by the non-metallic inclusion such as alumina.

According to the present invention, when 300 ton per charge of a low carbon aluminum killed steel was continuously cast by 2 strand slab caster, 5 to 7 charges of the steel were cast with the use of single nozzle without clogging.

Meanwhile, according to the conventional nozzle, when 2 to 4 chages of the steel were cast, the nozzle was clogged up and the casting had to be interrupted. As mentioned above, the effect of this invention was remarkable.

TABLE 1

|  |  | Sample of the invention No. | | | | | Sample for comparison No. | | | |
| --- | --- | --- | --- | --- | --- | --- | --- | --- | --- | --- |
|  |  | ① | ② | ③ | ④ | ⑤ | ⑥ | ⑦ | ⑧ | ⑨ |
| Composition (wt. %) | Graphite |  |  |  |  |  |  |  |  | 10 |
|  | Roseki | 80 | 65 | 40 | 40 | 40 | 90 | 40 | 30 | 70 |
|  | $ZrO_2$ | 20 | 35 | 60 | 30 |  | 10 | 30 | 70 | 20 |
|  | $ZrO_2 \cdot SiO_2$ |  |  |  | 30 | 60 |  |  |  |  |
|  | $SiO_2$ |  |  |  |  |  |  | 30 |  |  |
| Physical Property | Porosity (%) | 12.8 | 13.3 | 13.4 | 13.7 | 13.1 | 12.8 | 13.1 | 13.5 | 16.5 |
|  | Bulk density | 2.68 | 2.75 | 3.00 | 2.88 | 2.77 | 2.62 | 2.46 | 2.43 | 2.16 |
|  | Flexural Strength(Mpa) | 9.3 | 8.6 | 9.2 | 8.6 | 7.8 | 8.4 | 8.7 | 8.7 | 7.8 |
|  | Thermal conductivity (Kcal/m · hr · °C.) | 1.0 | 0.7 | 0.6 | 0.8 | 0.9 | 1.1 | 0.6 | 0.6 | 9.8 |
|  | Erosion to molten steel (Temperature of molten steel 1520° C.) | 5 | 4 | 1 | 2 | 3 | 10 | 6 | 1 | 4 |
|  | Permeability ($10^{-4}$ × darcy) After Heat-treatment 1500° C. - 1 hr | 1.0 | 2.0 | 2.5 | 2.8 | 2.6 | 0.8 | 4.0 | 8.5 | 650 |
|  | Spalling resistance | No crack | No crack | No crack | No crack | No crack | No crack | No crack | Cracks | No crack |
|  | Amount of Alumina adhesion (mm) | ≈0 | ≈0 | ≈1 | ≈0.5 | ≈1 | 0 | 5 | 8 | 3 |
|  | Amount of metal adhesion (mm) (Temperature of molten steel 1520° C.) | ≈0 | ≈0 | ≈0.5 | ≈0.5 | ≈0.5 | 0 | 1 | 1 | 3 |

What is claimed is:

1. A continuous casting nozzle for casting molten steel, wherein at least a surface layer of an inner bore of said continuous casting nozzle contacting with a molten steel is formed of a refractory comprising:

an aggregate consisting essentially of zirconia ($ZrO_2$) having a melting point of at least 1750° C., wherein said aggregate is present in an amount from about 15 to about 60 wt. %; and roseki as a balance.

2. A continuous casting nozzle according to claim 1, wherein said roseki comprises pyrophyllite ($Al_2O_3 \cdot 4SiO_2 \cdot H_2O$) as its main component.

3. A continuous casting nozzle for casting molten steel, wherein at least a surface layer of an inner bore of said continuous casting nozzle contacting with a molten steel is formed of a refractory comprising:

an aggregate consisting essentially of zirconia ($ZrO_2$) having a melting point of at least 1750° C., wherein said aggregate is present in an amount from about 15 to about 60 wt. %; and roseki as a balance; said refractory being added thermosetting resin as binder, kneaded, formed, and sintered in an anti-oxidizing atmosphere.

4. A continuous casting nozzle according to claim 3, wherein said roseki comprises pyrophyllite ($Al_2O_3 \cdot 4SiO_2 \cdot H_2O$) as its main component.

5. A continuous casting nozzle according to claim 3, wherein said roseki comprising roseki which is calcinated at a temperature of at least 800° C. so as to remove crystal water therein.

* * * * *